United States Patent
Nagai et al.

(10) Patent No.: US 9,193,597 B2
(45) Date of Patent: Nov. 24, 2015

(54) METHOD FOR PURIFYING CHLOROSILANES

(75) Inventors: Naoki Nagai, Niigata (JP); Takaaki Shimizu, Niigata (JP); Katsuhiro Uehara, Niigata (JP); Tohru Kubota, Niigata (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 975 days.

(21) Appl. No.: 13/386,926

(22) PCT Filed: Jul. 7, 2010

(86) PCT No.: PCT/JP2010/004441
§ 371 (c)(1),
(2), (4) Date: Jan. 25, 2012

(87) PCT Pub. No.: WO2011/018875
PCT Pub. Date: Feb. 17, 2011

(65) Prior Publication Data
US 2012/0121493 A1    May 17, 2012

(30) Foreign Application Priority Data

Aug. 12, 2009   (JP) ................. 2009-187302

(51) Int. Cl.
*C01B 33/107*    (2006.01)
(52) U.S. Cl.
CPC ................. *C01B 33/10778* (2013.01)
(58) Field of Classification Search
CPC ................................ C01B 33/10778
USPC ....................................... 423/325
See application file for complete search history.

(56) References Cited

U.S. PATENT DOCUMENTS 3,126,248 A    3/1964    Pohl et al.
3,252,752 A    5/1966    Pohl et al.
(Continued)

FOREIGN PATENT DOCUMENTS

CN    1807433 A    7/2006
CN    101065324 A    10/2007
JP    58 500895    6/1983
(Continued)

OTHER PUBLICATIONS

Combined Chinese Office Action and Search Report Issued Jun. 8, 2013 in Patent Application No. 201080035441.5 (with English translation).

(Continued)

*Primary Examiner* — Jennifer A Smith
(74) *Attorney, Agent, or Firm* — Oblon, McClelland, Maier & Neustadt, L.L.P.

(57) ABSTRACT

The present invention provides a method for obtaining high purity chlorosilanes from chlorosilanes containing boron impurities and phosphorus impurities. On the basis of the finding that solid by-product formation in the purification of chlorosilanes by adding an aromatic aldehyde results from a catalytic reaction by iron ions or rust-like iron, a Lewis base having a masking effect is added to chlorosilanes. Examples of the Lewis base include a divalent sulfur-containing compound and an alkoxysilane. The divalent sulfur-containing compound is preferably a compound represented by the formula: R—S—R' (wherein R is a hydrocarbon group or a carbonyl group; and the sum of the carbon atoms in R and R' is 7 or more), and the alkoxysilane is preferably a compound represented by the formula: $R_xSi(OR')_{4-x}$ (wherein R and R' are each an alkyl group having 1 to 20 carbon atoms).

20 Claims, 2 Drawing Sheets

(56) References Cited

U.S. PATENT DOCUMENTS

| | | | |
|---|---|---|---|
| 4,374,110 | A | 2/1983 | Darnell et al. |
| 4,409,195 | A | 10/1983 | Darnell et al. |
| 2008/0314728 | A1 | 12/2008 | Ghetti |
| 2009/0068081 | A1 | 3/2009 | Uehara et al. |

FOREIGN PATENT DOCUMENTS

| | | |
|---|---|---|
| JP | 2005 67979 | 3/2005 |
| JP | 2009 62213 | 3/2009 |

OTHER PUBLICATIONS

International Search Report Issued Aug. 10, 2010 in PCT/JP10/04441 Filed Jul., 7, 2010.

METHOD FOR PURIFYING CHLOROSILANES

CROSS REFERENCES TO RELATED APPLICATIONS

This application is a 371 of International Patent Application No. PCT/JP10/004441, filed on Jul. 7, 2010, and claims priority to Japanese Patent Application No. 2009-187302, filed on Aug. 12, 2009.

TECHNICAL FIELD

The present invention relates to a method for purifying chlorosilanes, more particularly to a method for obtaining high purity chlorosilanes by removing impurities from chlorosilanes containing boron impurities and phosphorus impurities.

BACKGROUND ART

Generally, high purity is required for polycrystalline silicon used as a raw material for producing a semiconductor and the like. It is therefore required that the chlorosilanes used as a raw material for producing polycrystalline silicon should have very high purity. For example, when boron and phosphorus are contained in chlorosilanes as impurities, even a very small amount of these impurities will significantly affect the electrical properties (resistivity) of polycrystalline silicon. Therefore, it will be practically meaningful to provide a technique of efficiently removing boron impurities and phosphorus impurities contained in chlorosilanes.

Generally, crude chlorosilanes are obtained by a known method from a metallurgical-grade silicon (so-called metal-grade silicon, hereinafter referred to as "metallic silicon") which contains a relatively large amount of impurities, and the crude chlorosilanes thus obtained are further purified to high purity by distillation or the like to obtain chlorosilanes. However, since boron and phosphorus are generally contained in metallic silicon in an amount in the order of several hundred ppb to several hundred ppms in terms of the element, these impurities are removed insufficiently in the process of purifying crude chlorosilanes, and boron and phosphorus may remain as impurities in the chlorosilanes finally obtained. These residual impurities may pose a problem.

In order to obtain crude chlorosilanes, there is well known a method in which metallic silicon is brought into contact with hydrogen chloride in the presence of a catalyst to chlorinate the metallic silicon and the resulting product is distilled (for example, refer to Japanese Patent Laid-Open No. 2005-67979 (Patent Literature 1)). The crude chlorosilanes refer to a fraction in this distillation and are generally a mixture of one or two or more chlorosilanes selected from dichlorosilane, trichlorosilane, and tetrachlorosilane.

Boron impurities and phosphorus impurities contained in metallic silicon are chlorinated at the same time as the crude chlorosilanes are produced, and are mixed into the crude chlorosilanes as a form of compounds having various structures. Such crude chlorosilanes are purified to obtain chlorosilanes, but it is difficult to separate and remove, in the distillation step, compounds having boiling points which are close to those of the chlorosilanes to be finally obtained. Boron compounds and phosphorus compounds may be thus mixed into (may remain in) the distillation fraction as impurities. If polycrystalline silicon is produced using such chlorosilanes, boron and phosphorus will be incorporated into the polycrystalline silicon, leading to a result that cannot obtain a polycrystalline silicon having desired properties.

The main reason why it is difficult to remove boron and phosphorus as impurities which are contained in crude chlorosilanes by a general distillation method is that these impurities are present in the form of compounds having low boiling points. Specifically, although the boron and phosphorus in crude chlorosilanes can take the form of various hydrides or chlorides, boron and phosphorus are usually present in the form of boron trichloride ($BCl_3$) and phosphorus trichloride ($PCl_3$), respectively, having low boiling points. However, a general distillation method cannot easily remove such volatile compounds from the chlorosilanes to a very low concentration level required for polycrystalline silicon to have desired properties.

Under the circumstances, various methods have been proposed as a method for reducing the content of boron impurities and phosphorus impurities in crude chlorosilanes or chlorosilanes (method for purifying chlorosilanes). For example, National Publication of International Patent Application No. 1983-500895 to D. R. D et al. (Patent Literature 2) has proposed a method comprising: introducing a small amount of oxygen into chlorosilanes at a high temperature condition to allow the chlorosilanes to react with the oxygen to form a complex; allowing the complex to react with boron impurities and phosphorus impurities to produce a new complex; and separating the new complex in the distillation step of the chlorosilanes to obtain chlorosilanes having a low impurity concentration.

Further, U.S. Pat. No. 3,126,248 to F. A. Pohl et al. (Patent Literature 3) has proposed a method comprising: producing an adduct of an organic substance containing an element having a lone electron pair such as benzaldehyde and valerolactone with boron impurities; and then distilling the resulting mixture to remove the impurity.

Furthermore, U.S. Pat. No. 3,252,752 to the same inventors (Patent Literature 4) has reported a method comprising: catching and removing boron impurities with benzaldehyde, propionitrile, or the like immobilized on an adsorbent such as activated carbon and silica gel.

On the other hand, Japanese Patent Laid-Open No. 2009-62213 (Patent Literature 5) has reported that when chlorosilanes containing boron impurities and phosphorus impurities are treated by introducing oxygen in the presence of an aromatic aldehyde, the boron impurities and the phosphorus impurities can be converted into high-boiling compounds at the same time and can be easily removed during the distillation of chlorosilanes, without using a high temperature as in a method disclosed in Patent Literature 2.

The method for removing impurities using an aromatic aldehyde as disclosed in Patent Literature 5 allows the impurities to be converted into high-boiling compounds, the distillation of the impurities from the bottom of a single evaporator or a distillation column to be suppressed, and the impurities to be concentrated and removed at a high concentration, thus allowing reduction in the amount of trichlorosilanes which accompanies the disposal. Therefore, this method also has advantages in cost.

However, as a result of investigation by the present inventors, it has been found that when a large amount of chlorosilanes is treated with an aromatic aldehyde, solids derived from the aldehyde compound may be newly produced in piping or in a strainer, and the solids may interfere with the control of the purification system including a purification apparatus.

Particularly, in a place where a solution containing concentrated aromatic aldehyde stagnates such as piping for discharging a residue from a still, solid production becomes remarkable to block the piping or the strainer, which will require disassembling of the piping to perform solids-removing operation depending on the case. Further, if the concentration of the aldehyde compound in the residue is somewhat reduced by reducing the concentration rate in order to relieve the above-described bad influence of solids, the discarded amount of chlorosilane which is the target compound for purification will be increased. Therefore, the reduction in the concentration rate is not practical.

CITATION LIST

Patent Literature

Patent Literature 1
Japanese Patent Laid-Open No. 2005-67979
Patent Literature 2:
National Publication of International Patent Application No. 1983-500895
Patent Literature 3:
U.S. Pat. No. 3,126,248
Patent Literature 4:
U.S. Pat. No. 3,252,752
Patent Literature 5:
Japanese Patent Laid-Open No. 2009-62213

SUMMARY OF INVENTION

Technical Problem

The present invention has been made in view of such problems, and an object of the present invention is to provide a technique of suppressing solid production during distillation to prevent the blockage of piping and a strainer to simplify the operation control of a purification system, in a method for purifying chlorosilanes which is performed by adding an aromatic aldehyde.

Solution to Problem

In order to solve such problems, the method for purifying chlorosilanes of the present invention is characterized by using an aromatic aldehyde as an impurity remover and adding a non-nucleophilic Lewis base as an inhibitor of solid by-product formation.

As known well, a non-nucleophilic Lewis base which is an inhibitor of solid by-product formation contains in the molecule an atom having an unshared electron pair which shows Lewis basicity, and it is a molecule which does not cause a nucleophilic substitution reaction to a silicon atom of chlorosilanes. Preferably, the inhibitor of solid by-product formation includes at least one or more divalent sulfur-containing compounds, such as compounds represented by R—S—R', wherein R is a hydrocarbon group having 1 to 20 carbon atoms containing an aliphatic or aromatic skeleton; R' is a hydrocarbon group having 1 to 20 carbon atoms containing an aliphatic or aromatic skeleton, or a carbonyl group substituted with a hydrocarbon group having 1 to 20 carbon atoms containing an aliphatic or aromatic skeleton; and the sum of the carbon atoms in R and R' is 7 or more.

The inhibitor of solid by-product formation may include at least one or more alkoxysilanes.

An example of the alkoxysilanes includes a compound represented by: $R_xSi(OR')_{4-x}$, wherein R and R' are each an alkyl group having 1 to 20 carbon atoms, and x is 0, 1, 2, or 3.

Further, an example of the chlorosilanes includes trichlorosilane ($HSiCl_3$).

On the basis of the finding that solid production (by-product formation) in the purification of chlorosilanes by adding an aromatic aldehyde results from a catalytic reaction by iron ions or rust-like iron, a Lewis base having a masking effect is added to chlorosilanes in the present invention. This allows the present invention to provide a technique of suppressing production of solids during distillation to prevent the blockage of piping and a strainer to simplify the operation control of a purification system.

DESCRIPTION OF EMBODIMENTS

Figure 1:
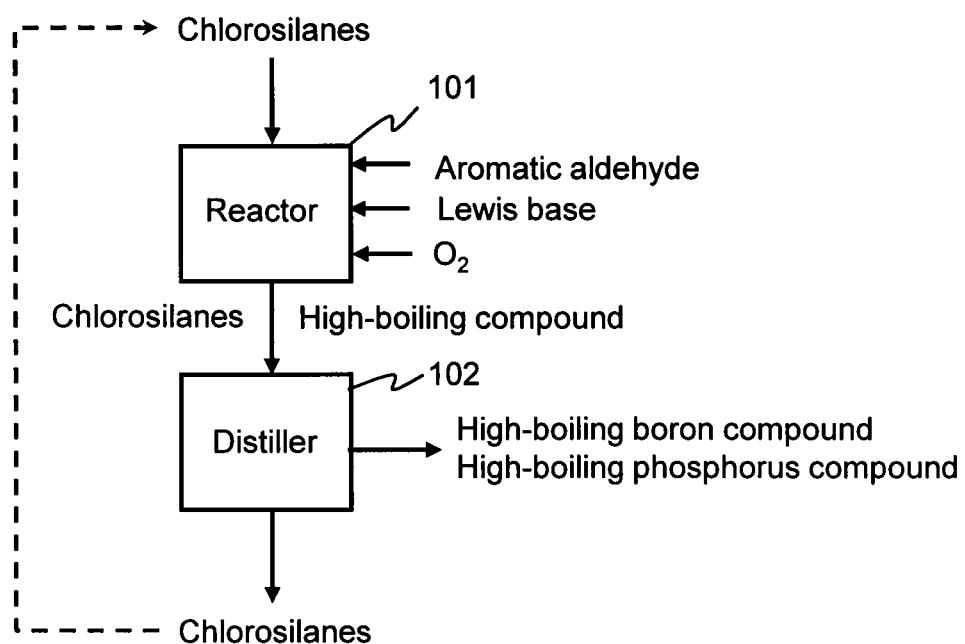
FIG. 1 is a diagram for illustrating a first example of steps in the method for purifying chlorosilanes of the present invention.

Hereinafter, the method for purifying chlorosilanes of the present invention will be described with reference to the drawings.

The present inventors have extensively investigated the suppression of solids produced during distillation in the purification of chlorosilanes by adding an aromatic aldehyde. As a result, the present inventors have found that solid production (by-product formation) results from a catalytic reaction by iron ions or rust-like iron derived from materials of a distillation apparatus, piping, or the like. In addition, the present inventors have found that the solid by-product formation as described above can be suppressed by suppressing the above catalytic action, and have come to complete the present invention.

According to the investigation by the present inventors, in the purification of chlorosilanes in an apparatus for producing purified chlorosilanes by using an aromatic aldehyde as a remover of very small amount of impurities, solids which are not produced in a flask experiment or the like are formed as by-products. These solids are produced as a result of catalytic action of iron ions or rust-like iron derived from materials of a distillation facility, piping, or the like.

That is, production facilities such as a distillation facility are generally made of iron or stainless steel. Therefore, a trace amount of iron ions or rust-like iron is inevitably mixed into a purification facility of a practical scale used for the purification of a compound such as chlorosilanes. Then, such iron ions or rust-like iron acts as a catalyst in a reaction to by-product solids.

According to the investigation such as the analysis of by-products by the present inventors, it is estimated that the by-product formation route of the solids as described above mainly include the following two routes.

The first route of by-product formation is a route in which an aromatic aldehyde (PhCHO) reacts with chlorosilane to produce $PhCHCl_2$ and a compound having a siloxane bond, that is, silica solids, as shown in the following formulas.

First, $HCl_2SiOSiHCl_2$ is produced according to the following reaction formula 1, in which $Fe^{n+}$ or iron rust is involved.

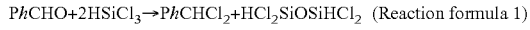
$PhCHO+2HSiCl_3 \rightarrow PhCHCl_2+HCl_2SiOSiHCl_2$ (Reaction formula 1)

$HCl_2SiOSiHCl_2$ produced in the above reaction formula 1 reacts with PhCHO and $HSiCl_3$ according to the following reaction formula 2, in which $Fe^{n+}$ or iron rust is involved.

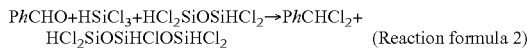
$PhCHO+HSiCl_3+HCl_2SiOSiHCl_2 \rightarrow PhCHCl_2+HCl_2SiOSiHClOSiHCl_2$ (Reaction formula 2)

Accordingly, the above-described reactions in which $Fe^{n+}$ or iron rust is involved can be represented by the following reaction formula 3.

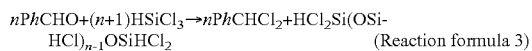
(Reaction formula 3)

A second by-product formation route is a route in which PhCHCl$_2$ produced from PhCHO and chlorosilane reacts with hydrochlorosilane to produce PhCH$_2$Cl, and the PhCH$_2$Cl or residual PhCHCl$_2$ undergoes Friedel-Crafts reaction to produce benzylidene polymer solids, as shown in the following formulas.

First, PhCH$_2$Cl is produced in the following reaction formula 4, in which $Fe^{n+}$ or iron rust is involved.

(Reaction formula 4)

PhCH$_2$Cl produced in the above reaction formula 4 reacts with PhCHRCl according to the following reaction formula 5, in which $Fe^{n+}$ or iron rust is involved.

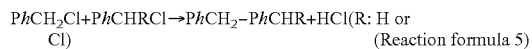
(Reaction formula 5)

Accordingly, the above-described reactions in which $Fe^{n+}$ or iron rust is involved can be represented by the following reaction formula 6.

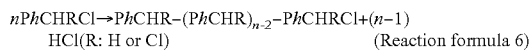
(Reaction formula 6)

In the first and the second by-product formation routes as described above, iron is involved as a Lewis acid catalyst. Accordingly, in order to prevent by-product formation, it is effective to add a Lewis base having a masking effect to chlorosilanes. Adding a Lewis base to chlorosilanes can suppress a catalytic reaction by iron ions or rust-like iron, thus capable of suppressing solid by-product formation.

The non-nucleophilic Lewis base as such an inhibitor of solid by-product formation includes at least one or more divalent sulfur-containing compounds. A divalent sulfur-containing compound effectively suppresses the solid by-product formation and has a low risk of degrading the quality of chlorosilanes.

Specific examples include a divalent sulfur-containing compound represented by R—S—R', wherein R is a hydrocarbon group having 1 to 20 carbon atoms containing an aliphatic or aromatic skeleton; R' is a hydrocarbon group having 1 to 20 carbon atoms containing an aliphatic or aromatic skeleton, or a carbonyl group substituted with a hydrocarbon group having 1 to 20 carbon atoms containing an aliphatic or aromatic skeleton; and the sum of the carbon atoms in R and R' is 7 or more.

The hydrocarbon group denoted by R may be an aliphatic group or an aromatic group, or may be an alkyl group having an aromatic ring as a substituent or an aromatic ring having an alkyl substituent. The hydrocarbon group can include a linear, branched, or cyclic alkyl group having 1 to 20 carbon atoms, which may include an unsaturated bond therein. The aromatic group can include a phenyl group, a naphthyl group, and an anthracenyl group. Further, the alkyl group having an aromatic ring as a substituent can include a benzyl group and a 2-phenylethyl group.

R' in the above formula may be selected from among the same as represented by R, or may be a carbonyl group substituted with R (—(C=O)—R) as described above. In this case, the compound represented by the general formula R—S—R' is a so-called thioester compound.

A compound which is inexpensively available in a large amount and is practical among the compounds represented by the above general formula R—S—R' can include methylphenylthioether, diphenylthioether, and phenylacetate thioester.

The function of preventing solid by-product formation by a compound represented by the general formula R—S—R' is not largely influenced by the size of R and R' itself, and the compound can be selected from a wide range. However, in order to function as a Lewis base, it is preferred that the substituent of a sulfur atom (S) be not so bulky. Therefore, when both R and R' are hydrocarbon groups, it is preferred that at least one of them be a methyl group or a methylene group which has a carbon atom combined with a sulfur atom.

According to a model experiment conducted by the present inventors, it is also effective to add at least one alkoxysilane in order to suppress solid by-product formation through the first by-product formation route as described above.

Specific examples of the alkoxysilane can include those represented by $R_xSi(OR')_{4-x}$, wherein R and R' are each an alkyl group having 1 to 20 carbon atoms, and x is 0, 1, 2, or 3.

Examples of such alkoxysilane which can be easily available and is practical can include Si(OCH$_3$)$_4$, CH$_3$Si(OCH$_3$)$_3$, CH$_3$Si(OC$_2$H$_5$)$_3$, C$_2$H$_5$Si(OCH$_3$)$_3$, C$_2$H$_5$Si(OC$_2$H$_5$)$_3$, (CH$_3$)$_2$Si(OCH$_3$)$_2$, (CH$_3$)$_2$Si(OC$_2$H$_5$)$_2$, and Si(OC$_2$H$_5$)$_4$.

According to a model experiment conducted by the present inventors, the results show that, while alkoxysilanes are effective to suppress solid by-product formation through the first by-product formation route as described above, the effect of alkoxysilanes to suppress solid by-product formation through the second by-product formation route is not so high. However, alkoxysilanes have the following desirable characteristics.

That is, in order to function as a Lewis base, it is preferred that the substituent of a sulfur atom (S) be not so bulky, as described above. Accordingly, when this substituent is a little bulky, an effect on preventing solid by-product formation may be insufficient. For example, according to a model experiment conducted by the present inventors, a small amount of solids will be formed when benzaldehyde and trichlorosilane are treated for a long time using diphenylthioether as an inhibitor of solid by-product formation. According to the model reaction, the ability to suppress solid by-product formation through the first by-product formation route as described above will be reduced when thioethers having a relatively bulky substituent on both sides such as diphenylthioether are used as an inhibitor of solid by-product formation. However, it has been found that the solid by-product formation can be effectively suppressed by a combined use of alkoxysilanes which show a strong effect to suppress solid by-product formation through the first by-product formation route and a divalent sulfur compound.

The method for purifying chlorosilanes of the present invention in which an aromatic aldehyde is used as an impurity remover and a Lewis base is added as an inhibitor of solid by-product formation is particularly useful in the purification of chlorosilane (HSiCl$_3$) and allows highly efficient production of high purity polysilicon.

FIG. 1 is a diagram for illustrating a first example of steps in the method for purifying chlorosilanes of the present invention. Chlorosilanes containing boron impurities and phosphorus impurities and oxygen are fed to a reactor 101, wherein the boron impurity and the phosphorus impurity are allowed to react with oxygen in an environment where an aromatic aldehyde as an impurity remover and a Lewis base as an inhibitor of solid by-product formation are added, and are, converted to high-boiling compounds. The chlorosilanes (and high-boiling compounds of boron and phosphorus) after having been treated in the reactor 101 are discharged into a distiller 102, and the chlorosilanes are separated from the high-boiling compounds of boron and phosphorus, thereby purifying chlorosilanes.

In the present invention, not only trichlorosilane but also other chlorosilanes such as dichlorosilane and tetrachlorosilane can be the target of purification.

Further, examples of chlorosilanes which are the target of purification in the present invention include a wide range of chlorosilanes such as crude chlorosilanes formed as a by-product by the reaction of metallic silicon with HCl (such chlorosilanes generally include dichlorosilane or tetrachlorosilane in addition to trichlorosilane), chlorosilanes from which high-boiling components have been removed or chlorosilanes from which low-boiling components have been removed by distillation of the crude chlorosilanes, and a trichlorosilane fraction which has been relatively highly purified. Any one of these chlorosilanes is the target of the present invention.

Note that conditions such as treatment temperature in the reactor 101 may be the same as those described in Patent Literature 5 (Japanese Patent Laid-Open No. 2009-62213).

A reaction in the reactor 101 is performed in the presence of an aromatic aldehyde, and a benzaldehyde derivative such as benzaldehyde can be used as the aromatic aldehyde.

Suitable examples of the aromatic aldehyde used in the present invention can include a benzaldehyde derivative represented by the following chemical formula.

[Formula 1]

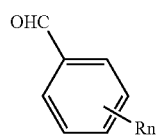

Note that, in the above chemical formula, R is a linear, branched, or cyclic alkyl group having 1 to 30 carbon atoms or a phenyl group which may be substituted with a linear, branched, or cyclic alkyl group having 1 to 30 carbon atoms, and n is 0, 1, 2, or 3. Preferably, R is a methyl group or an ethyl group, and n is 0, 1, or 2.

Among these, benzaldehyde in which n is 0 is particularly preferred. Benzaldehyde in which n is 0 has several advantages including having excellent economical efficiency because it is inexpensive and the amount used per mole can be relatively small because of its low molecular weight. Further, the advantages include having easy handleability because it is liquid at ordinary temperature, has a relatively high boiling point (178° C.), and is also excellent in safety. Furthermore, the advantages include high reactivity with boron impurities and a high catalytic effect on the reaction of phosphorus impurities with an oxygen molecule.

The amount of the aromatic aldehyde added is not particularly limited, but it is preferably 1 to 1000 times in mole, particularly preferably 1 to 100 times in mole relative to the total moles of boron and phosphorus impurities. If the amount is 1 time in mole or less, the impurities may remain, and if the amount is 1000 times in mole or more, it may be economically disadvantageous.

The above inhibitor of solid by-product formation can be used not only in a method for preventing solid by-product formation during distillation but also in a method for preventing solid by-product formation during the transfer of a distillation residual liquid. Although the by-product formation reaction is promoted during distillation, the solid formation can be avoided to a certain extent when a batch distillation is performed in a relatively short time. However, in the piping or the like for treating the distillation residual liquid, stagnation of a high-concentration aromatic aldehyde compound-related derivative is unavoidable. Thus, when the above inhibitor of solid by-product formation is used for preventing solid by-product formation during distillation, it is preferred that the inhibitor be previously mixed with the aromatic aldehyde and then used in the impurity removal reaction to be described below. However, when it is specifically added to a place where the distillation residual liquid stagnates such as piping and a waste liquid tank to prevent solid by-product formation, it may be separately added to a reactor after reaction, piping for transfer, and a tank.

Although a method for purifying chlorosilanes using an aromatic aldehyde can be used as a method for removing boron impurities without allowing oxygen to be contained, phosphorus impurities can be converted to a high-boiling compound at a low temperature by introducing both the aromatic aldehyde and an oxygen-containing gas into chlorosilanes to treat the chlorosilanes. The temperature of the reaction to convert the phosphorus compound into a high-boiling compound is not particularly limited, but it is preferably 0 to 150° C. If the temperature is lower than 0° C., the efficiency of the reaction to convert the phosphorus compound to a high-boiling compound may be decreased. Further, if the temperature is higher than 150° C., the aromatic aldehyde may cause a side reaction or pose a problem of safety. Therefore, these temperatures are not preferred.

The mixing time for treating chlorosilanes with the aromatic aldehyde is not particularly limited, but it is preferably several minutes to 24 hours when a batch method is employed. Note that when chlorosilanes are reacted by a semi-continuous method or a continuous method, the residence time of the treated mixture in the reactor can be arbitrarily selected.

Further, although chlorosilanes may be mixed with oxygen in a liquid state or in a gas state, the mixing is preferably performed in a liquid state when chlorosilanes are mixed with the aromatic aldehyde. Note that when a mixture of the oxygen-containing gas or of the aromatic aldehyde is introduced into liquid chlorosilanes, the mixture may be supplied into the liquid or to the liquid surface without any particular limitation.

In order to improve the efficiency of reactions of the oxygen-containing gas or aromatic aldehyde with the boron and phosphorus impurities contained in the chlorosilanes, the whole mixture is preferably in a stirred or shaken state during the mixing or staying in the reactor 101. Note that, in the above operation, any of a batch method, a semi-continuous method, and a continuous method can be selected, and the operating method is not particularly limited.

The distiller 102 may be a known distillation apparatus. Note that the chlorosilanes obtained by distillation may be optionally circulated through the reactor 101 to repeat the removal of impurities and distillation. Here, FIG. 1 illustrates an example of steps in which chlorosilanes are circulated through a single reactor 101, but it is needless to say that an additional reactor and distiller may be provided to repeat purification.

Figure 2:
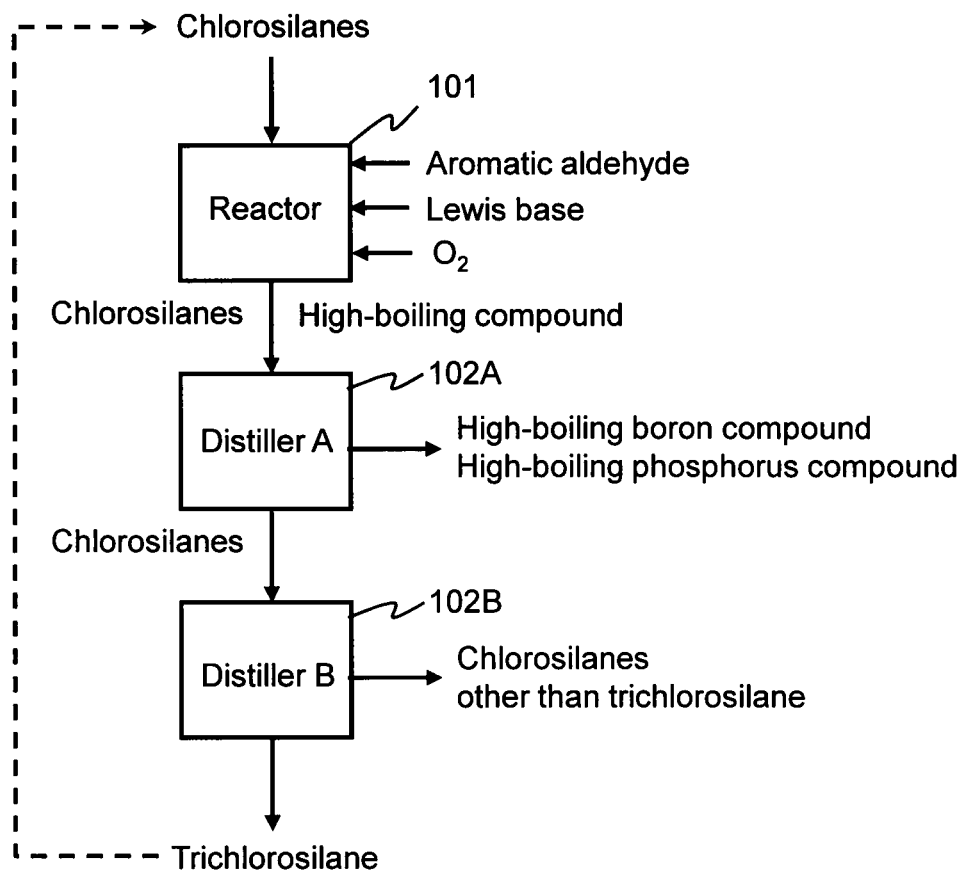
FIG. 2 is a diagram for illustrating a second example of steps in the method for purifying chlorosilanes of the present invention.

Further, a step of separating a specific chlorosilane (trichlorosilane) from the chlorosilanes after purification may be provided by providing a plurality of distillers, as illustrated in FIG. 2. Furthermore, the trichlorosilane obtained by the separation may be circulated through the reactor 101.

Anyway, the distillation step may be provided mainly for the purpose of removing boron and phosphorus impurities, or may combine the purpose of separating a specific chlorosilane (for example, trichlorosilane) from chlorosilanes.

With respect to the distillation method as described above, a known apparatus and method can be selected without a particular limitation. For example, the type of distillation columns, the number of stages of distillation, the number of distillation columns, and the like can be arbitrarily selected. Further, any of a packed column and a plate column can be selected as a distillation column. Furthermore, any of a batch method, a semi-continuous method, and a continuous method can be selected as a distillation method.

In the case of a batch method, both an oxygen-containing gas and an aromatic aldehyde can be introduced into chlorosilanes containing boron and phosphorus impurities in a distillation still to treat both of the impurities simultaneously, and then the resulting mixture can be moved to distillation operation as it is. Further, in the case of a continuous method, both the oxygen-containing gas and the aromatic aldehyde can be previously introduced into the chlorosilanes in a separate reactor to treat both of the impurities simultaneously, and then the resulting mixture can be continuously transported to a distillation still or a distillation column to distillate the chlorosilanes.

However, when aiming at increasing the recovery and utilization rate of chlorosilanes, a distillation step of separating and removing from chlorosilanes the boron and phosphorus impurities which have been converted to high-boiling compounds will be added to any part of the whole steps. In the distillation step, since the high-boiling compounds which have been converted from the boron and phosphorus impurities into chlorosilanes are separated from the chlorosilanes and remain in the distillation still as a distillation residue, these compounds are discharged from the system according to a selected distillation method. Further, since the unreacted aromatic aldehyde is also contained in the distillation residue, it is dealt with in the same manner. On this occasion, when the above inhibitor of solid by-product formation of the present invention is used during distillation, the solid by-product formation is suppressed in the above reaction/purification steps by the effect of the inhibitor. Accordingly, even if the concentration rate is greatly increased relative to conventional methods, the amount of the residue will be small, and the amount of chlorosilanes discharged with the discharge of the residue can be greatly reduced.

After distillation, the distillation residual liquid passes through the piping for waste liquid from a still, is once stored in a waste liquid tank, and is subjected to detoxification reaction before it is discarded. When the inhibitor of solid by-product formation of the present invention is used in this stage, it is preferred to add the above inhibitor of solid by-product formation to the distillation residual liquid after distillation and then send the resulting distillation residual liquid to the waste liquid tank. An alternative method may be used in which the inhibitor is separately added to a region, for example, a strainer or a tank, where adhesion of solids particularly poses a problem.

EXAMPLE 1

For the purpose of masking the iron which is involved in a reaction to form by-product solids, a sulfur-containing compound was added to verify the effect as an inhibitor of solid by-product formation.

Specifically, to $HSiCl_3$ (20 g) were added 1 g of $PhCHO$, $PhCH_2Cl$, or $PhCHCl_2$ and 2 g of $SPh_2$, $CH_3SPh$, or $CH_3COSPh$, and thereto was further added 0.01 g of $FeCl_3$ as a catalyst substance. These samples were put in an airtight container and allowed to stand for one week at ordinary temperature to examine the state of the solid by-product formation. The results are shown in Table 1.

TABLE 1

| | $SPh_2$ | | | $CH_3SPh$ | | | $CH_3COSPh$ | | |
|---|---|---|---|---|---|---|---|---|---|
| $PhCHO$ | ○ | X | X | ○ | X | X | ○ | X | X |
| $PhCH_2Cl$ | X | ○ | X | X | ○ | X | X | ○ | X |
| $PhCHCl_2$ | X | X | ○ | X | X | ○ | X | X | ○ |
| $FeCl_3$ | ○ | ○ | ○ | ○ | ○ | ○ | ○ | ○ | ○ |
| By-production of solids | Yes | No | No | No | No | No | No | No | No |

○: Added
X: Not added

From the results shown in Table 1, the solid by-product formation was not observed in samples other than the sample to which $PhCHO$ and $SPh_2$ were added, among the above nine samples. These results show that Friedel-Crafts polymerization in which $PhCH_2Cl$ and $PhCHCl_2$ polymerize in the presence of Fe is effectively suppressed with a sulfur-containing compound such as $CH_3SPh$ and $SPh_2$ and that in some cases the suppressing effect may be insufficient to siloxane polymerization.

COMPARATIVE EXAMPLE 1

To $HSiCl_3$ (20 g) was added 1 g of $PhCH_2Cl$ or $PhCHCl_2$, and thereto was added 0.01 g of $FeCl_3$ as a catalyst substance. That is, a sulfur-containing compound was not added. These samples were put in an airtight container and allowed to stand for one week at ordinary temperature to examine the state of the solid by-product formation. The results are shown in Table 2.

TABLE 2

| | Not added [S-containing compound] | |
|---|---|---|
| $PhCH_2Cl$ | ○ | X |
| $PhCHCl_2$ | X | ○ |
| $FeCl_3$ | ○ | ○ |
| By-production of solids | Yes | Yes |

○: Added
X: Not added

By-produced solids were produced in all of these samples, and strong absorption resulting from a phenyl group and a methylene group was observed as a result of infrared absorption spectrum analysis of the by-product solids. Thus, it was found that the by-product solids were a benzylidene polymer.

EXAMPLE 2

For the purpose of suppressing the reaction to form by-product solids by siloxane polymerization, an alkoxysilane was added to verify the effect as an inhibitor of solid by-product formation.

Specifically, to $HSiCl_3$ (20 g) were added 1 g of $PhCHO$, $PhCH_2Cl$, or $PhCHCl_2$ and 2 g of $CH_3Si(OCH_3)_3$ or $(CH_3)_2Si(OCH_3)_2$, and thereto was further added 0.01 g of $FeCl_3$ as a catalyst substance. These samples were put in an airtight container and allowed to stand for one week at ordinary temperature to examine the state of the solid by-product formation. The results are shown in Table 3.

TABLE 3

|  | CH$_3$Si(OCH$_3$)$_3$ | | | (CH$_3$)$_2$Si(OCH$_3$)$_2$ | | |
| --- | --- | --- | --- | --- | --- | --- |
| PhCHO | ○ | X | X | ○ | X | X |
| PhCH$_2$Cl | X | ○ | X | X | ○ | X |
| PhCHCl$_2$ | X | X | ○ | X | X | ○ |
| FeCl$_3$ | ○ | ○ | ○ | ○ | ○ | ○ |
| By-production of solids | No | Yes | Yes | No | Yes | Yes |

○: Added
X: Not added

From this experiment, it was found that alkoxysilanes had an effect of suppressing siloxane polymerization and that alkoxysilanes did not have an effect to prevent the by-product formation of a benzylidene polymer, which a sulfur-containing compound has.

COMPARATIVE EXAMPLE 2

To HSiCl$_3$ (20 g) was added 1 g of PhCHO, and thereto was further added 0.01 g of FeCl$_3$ as a catalyst substance. This sample was put in an airtight container and allowed to stand for one week at ordinary temperature to examine the state of the solid by-product formation. The results are shown in Table 4.

TABLE 4

|  | Not added [alkoxysilane] |
| --- | --- |
| PhCHO | ○ |
| FeCl$_3$ | ○ |
| By-production of solids | Yes |

○: Added
X: Not added

By-product solids were produced in this sample, and absorption resulting from a phenyl group and a methylene group was not observed as a result of infrared absorption spectrum analysis of the by-product solids. Thus, it was found that the by-product solids were polysiloxane.

EXAMPLE 3

An experiment to verify the effect of a combined use of a sulfur-containing compound and an alkoxysilane was performed.

Specifically, to HSiCl$_3$ (20 g) were added 1 g of PhCHO, PhCH$_2$Cl, or PhCHCl$_2$, 2 g of CH$_3$SPh as a sulfur-containing compound, and 2 g of CH$_3$Si(OCH$_3$)$_3$ as an alkoxysilane, and thereto was further added 0.01 g of FeCl$_3$ as a catalyst substance. These samples were put in an airtight container and allowed to stand for one week at ordinary temperature to examine the state of the solid by-product formation. The results are shown in Table 5.

TABLE 5

|  | Added CH$_3$SPh and CH$_3$Si(OCH$_3$)$_3$ | | |
| --- | --- | --- | --- |
| PhCHO | ○ | X | X |
| PhCH$_2$Cl | X | ○ | X |
| PhCHCl$_2$ | X | X | ○ |

TABLE 5-continued

|  | Added CH$_3$SPh and CH$_3$Si(OCH$_3$)$_3$ | | |
| --- | --- | --- | --- |
| FeCl$_3$ | ○ | ○ | ○ |
| By-production of solids | No | No | No |

○: Added
X: Not added

No solid by-product formation was observed in any of the samples, and it was possible to verify that the reaction to form by-product solids can be suppressed by the synergy of each suppressing effect.

Industrial Applicability

The present invention provides a method for obtaining high purity chlorosilanes from chlorosilanes containing boron impurities and phosphorus impurities by removing these impurities.

The invention claimed is:

1. A method for purifying a chlorosilane, the method comprising:
    mixing an aromatic aldehyde, a first component comprising an alkoxysilane, and a second component comprising a chlorosilane.
2. The method of claim 1 wherein said alkoxysilane is represented by formula (1):

$$R_xSi(OR')_{4-x} \qquad (1),$$

wherein
    R and R' are each independently an alkyl group having 1 to 20 carbon atoms, and
    x is 0, 1, 2, or 3.
3. The method of claim 1 wherein the second component comprises HSiCl$_3$.
4. The method of claim 3 wherein said second component further comprises H$_2$SiCl$_2$.
5. The method of claim 3 wherein said second component further comprises SiCl$_4$.
6. The method of claim 1 wherein said first component further comprises a divalent sulfur-comprising compound.
7. The method of claim 6 wherein the second component comprises HSiCl$_3$.
8. The method of claim 7 wherein said second component further comprises H$_2$SiCl$_2$.
9. The method of claim 7 wherein said second component further comprises SiCl$_4$.
10. The method of claim 6 wherein said divalent sulfur-comprising compound is represented by formula (3):

$$R\!-\!S\!-\!R' \qquad (3),$$

wherein
    R is a hydrocarbon group having 1 to 20 carbon atoms and an aliphatic or aromatic skeleton,
    R' is a hydrocarbon group having 1 to 20 carbon atoms and an aliphatic or aromatic skeleton, or a carbonyl group substituted with a hydrocarbon group having 1 to 20 carbon atoms and an aliphatic or aromatic skeleton, and
    a sum of the carbon atoms in R and R' is 7 or more.
11. The method of claim 10, wherein alkoxysilane is represented by formula (4):

$$R_xSi(OR')_{4-x} \qquad (4),$$

wherein
    R and R' are each independently an alkyl group having 1 to 20 carbon atoms, and
    x is 0, 1, 2, or 3.

12. The method of claim 10 wherein said second component comprises $HSiCl_3$.

13. The method of claim 10 wherein, in formula (3),
both R and R' are a hydrocarbon group, and
one of R and R' is a methyl group or a methylene group.

14. The method of claim 1 wherein the aromatic aldehyde is a benzaldehyde of formula (5):

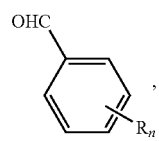

(5)

wherein
R is a linear, branched, or cyclic alkyl group having 1 to 30 carbon atoms or a phenyl group optionally substituted with a linear, branched, or cyclic alkyl group having 1 to 30 carbon atoms, and
n is 0, 1, 2, or 3.

15. The method of claim 14 wherein, in formula (5), R is a methyl group or an ethyl group, and n is 0, 1, or 2.

16. The method of claim 15 wherein, in formula (5), n is 0.

17. The method of claim 1 comprising:
(a) reacting a chlorosilane, which comprises a boron impurity and a phosphorus impurity, with oxygen, to obtain a high boiling compound of boron and a high boiling compound of phosphorus; and
(b) removing said chlorosilane from said high boiling compound of boron and said high boiling compound of phosphorus,
wherein said reacting is conducted in the presence of said aromatic aldehyde and said alkoxysilane.

18. The method of claim 17 wherein said alkoxysilane is represented by formula (1):

$R_xSi(OR')_{4-x}$  (1), wherein
R and R' are each independently an alkyl group having 1 to 20 carbon atoms, and
x is 0, 1, 2, or 3.

19. The method of claim 17 wherein said chlorosilane comprises $HSiCl_3$.

20. The method of claim 17 wherein said reacting is also conducted in the presence of a divalent sulfur-comprising compound.

* * * * *